Aug. 7, 1951 J. W. PARSONS 2,563,265
ROCKET MOTOR WITH SOLID PROPELLANT AND
PROPELLANT CHARGE THEREFOR
Filed Sept. 21, 1943 4 Sheets-Sheet 1
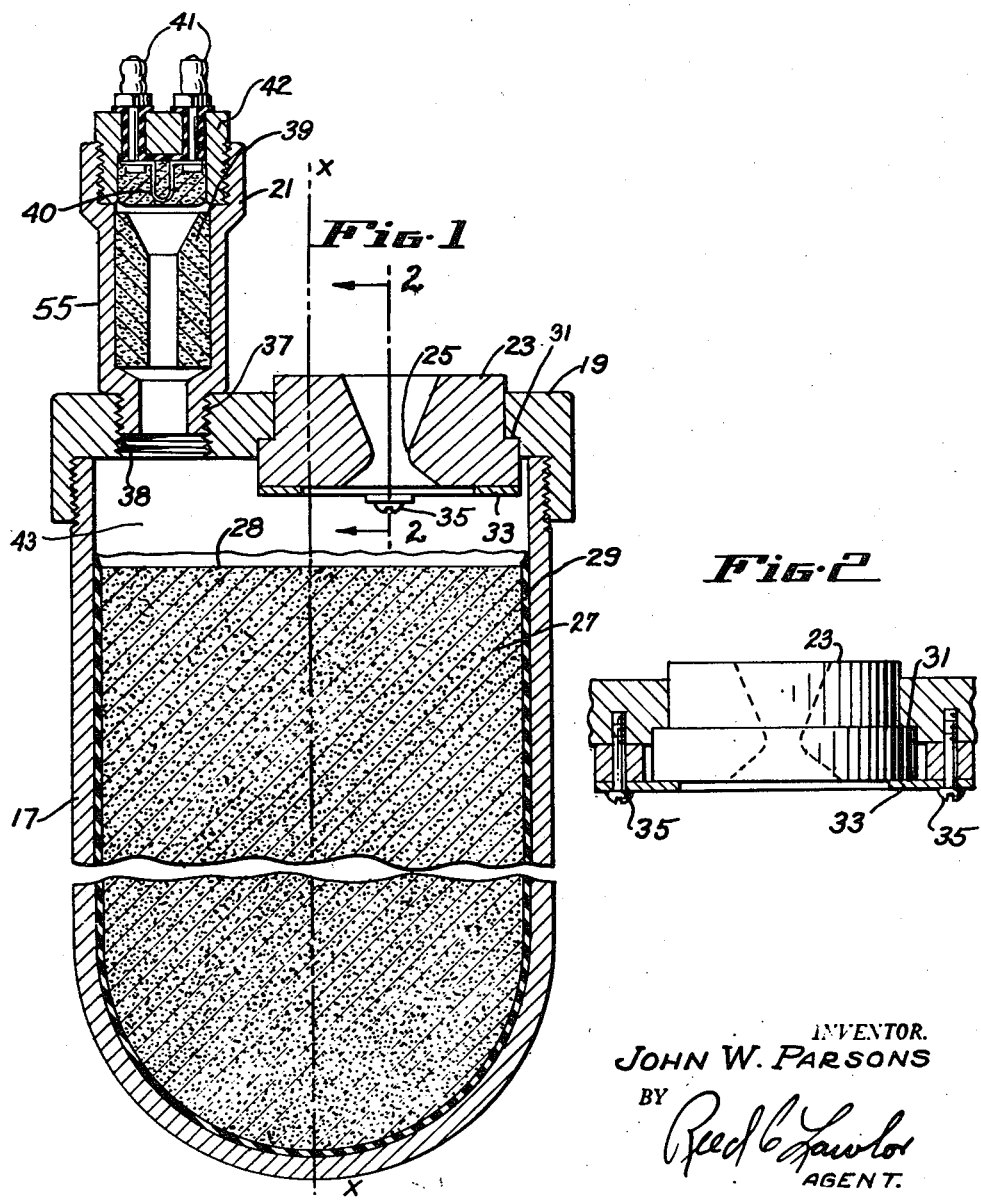
INVENTOR.
JOHN W. PARSONS
BY
Reed C Lawlor
AGENT.

Aug. 7, 1951 — J. W. PARSONS — 2,563,265
ROCKET MOTOR WITH SOLID PROPELLANT AND
PROPELLANT CHARGE THEREFOR
Filed Sept. 21, 1943 — 4 Sheets-Sheet 2
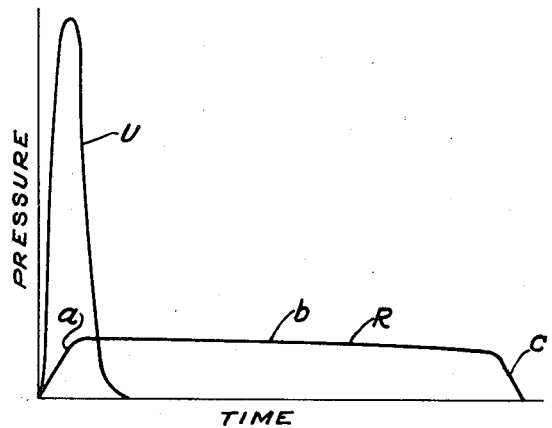
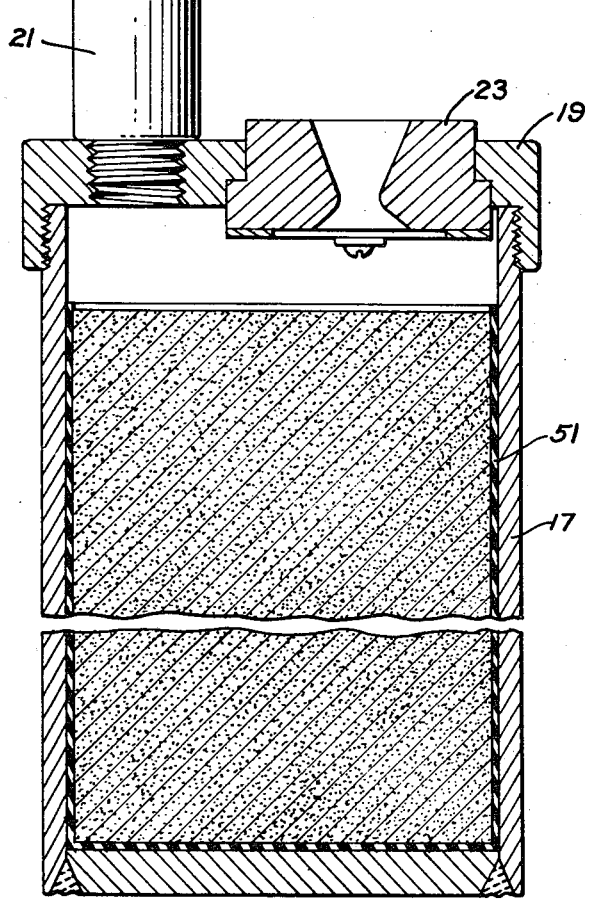
INVENTOR.
JOHN W. PARSONS.
BY
AGENT.

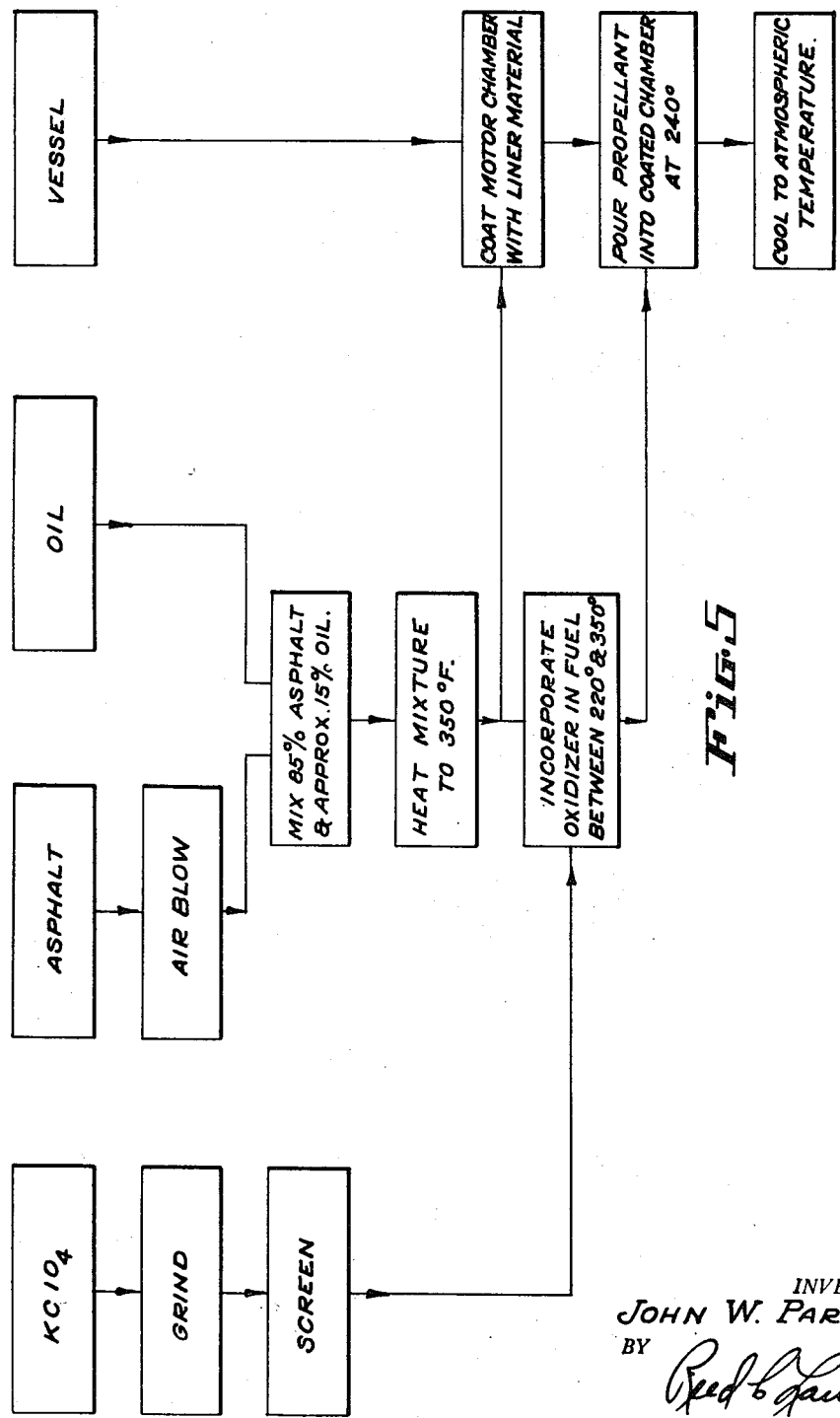

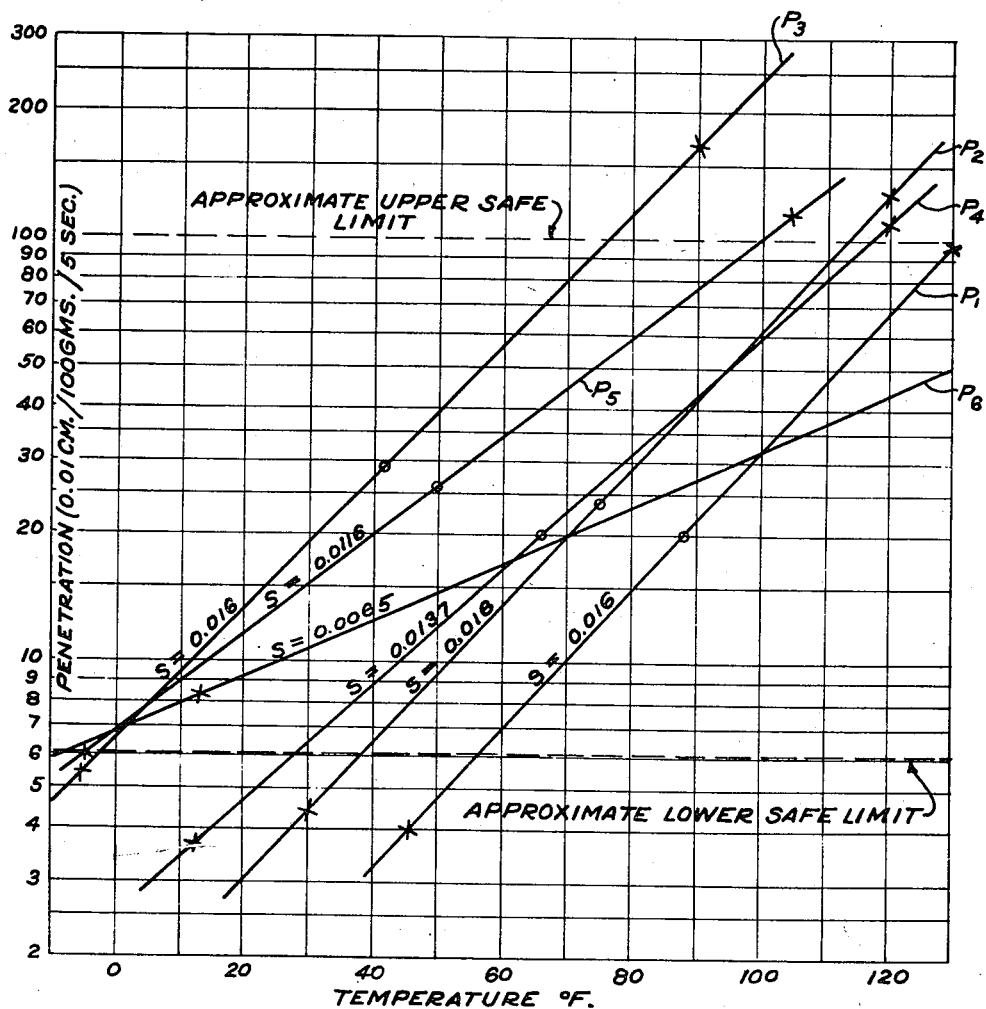

UNITED STATES PATENT OFFICE 2,563,265

ROCKET MOTOR WITH SOLID PROPELLANT AND PROPELLANT CHARGE THEREFOR

John W. Parsons, Pasadena, Calif., assignor to Aerojet Engineering Corporation, Azusa, Calif., a corporation of Delaware Application September 21, 1943, Serial No. 503,254

26 Claims. (Cl. 60—35.6)

My invention pertains to jet propulsion and more particularly to methods and means for increasing the reliability of rocket motors utilizing solid propellants.

An object of my invention is to provide a rocket motor of the solid propellant type in which "restricted burning" takes place; that is, the charge burns over its exposed surface without burning down between the charge and the chamber wall.

Other objects are to obtain an improved constant thrust over a substantial period of time; and still other objects are to provide a propellant charge adapted to be carried through a wide range of temperatures and which can be reconditioned if subjected to extremes of temperatures or other conditions.

Rocket motors containing solid propellant ordinarily comprise a combustion chamber having a nozzle in the wall thereof, a combustion charge within the chamber, and means for igniting the charge. The propellant in the chamber in this type of motor is a charge of solid combustible material which when ignited generates gas which escapes at high velocity through the nozzle.

In its broad aspect, my invention involves the use of a thermoplastic propellant substance comprising a fuel and the oxidizer required to burn the fuel. I prefer to place this charge in the chamber so that it provides a limited exposed area upon which combustion occurs.

According to a feature of my invention I bond the charge to the inside chamber wall to prevent the undesirable burning between the charge and the wall.

In the preferred form of my invention the propellant charge is of a thermoplastic nature and the bonding liner between the charge and the chamber is also a thermoplastic material. I prefer to use for the thermoplastic charge a combustible organic semi-solid, especially one of a predominantly hydrogen and carbon content. Hydrocarbons are preferred to other organic solids because of their high heats of combustion. I have found bitumens, especially asphalts, to be particularly suitable for the fuel component of the propellant.

Asphalts are preferred to other hydrocarbons because of the wide range of atmospheric temperatures over which they are plastic. Of the asphalts themselves I have found air-blown asphalts of a naphthenic or mixed naphthenic and paraffin base to be most satisfactory especially when mixed with a small proportion of a compatible oil of high viscosity index.

For the oxidizer I prefer to use one composed of fine solid particles uniformly dispersed in the plastic fuel of the character indicated above. The amount of fuel is preferably at least sufficient to fill the interstices between the particles of the comminuted oxidizer. The preferred oxidizer is potassium perchlorate ($KClO_4$) which is highly useful in the mixture because it contains a large amount of oxygen available for combustion, because of its stability both alone and in combination with plastic fuels, because of its commercial availability and comparatively low price, and because of its non-hygroscopic character.

I have found that a mixture of about three parts of $KClO_4$ to one part asphalt produces a propellant which is sufficiently plastic, substantialy impermeabble, and at the same time contains the desired excess of fuel.

The plastic liner between the propellant charge and the combustion chamber wall may be asphaltic.

To place the charge and the liner in the combustion chamber, I prefer first to coat the vessel forming the chamber with the thermoplastic liner and then cast the propellant in the lined vessel by pouring the propellant into the vessel at a temperature in a range such that the propellant flows readily without melting the liner.

In those mixtures with asphalt which utilize high viscosity index oil compatible with the asphalt, paraffinic base oils are suitable for this purpose.

The foregoing and other objects, embodiments, and features of my invention will be more readily understood by reference to the accompanying drawings in which:

Fig. 1 is a sectional view of a rocket motor constructed in accordance with my invention and utilizing a bonding liner between the propellant charge and the motor chamber;

Fig. 2 is a fragmentary side elevation partly in section of the nozzle and jet motor cap taken on the line 2—2 of Fig. 1;

Fig. 3 is a similar sectional view of another form of my invention utilizing a cartridge to which the propellant is bonded;

Fig. 4 represents graphs showing how the chamber pressure of a rocket motor varies as a function of time during its operation with and without my invention;

Fig. 5 is a block diagram showing the main steps of a process for making a rocket motor in accordance with my invention; and Fig. 6 is a graph showing penetration vs. temperature curves for some of the propellants.

DEFINITIONS

A few definitions are given here to aid in the explanation of my invention.

*Propellants.*—A distinction is made in this application between propellants and explosives.

As used herein the term propellant includes a substance which when ignited at some point on the surface thereof may burn progressively from that point to others at a visually perceptible rate. Propellants, for example, confined in an apertured chamber may burn at a rate of the order of from about 1/4 inch to 30 inches per second when the pressure of the combustion gases in contact with the burning surface is of the order of from about 200 to 60,0000 lbs. per square inch respectively.

On the other hand the term explosive is used to indicate a material in which combustion is propagated almost instantaneously. Thus, for example, combustion may be propagated in most explosives at velocities comparable to and greater than the speed of sound.

*Plasticity.*—A material is said to be plastic if it is capable of being deformed continuously and permanently in any direction without rupture under a stress exceeding the yield value. In other words, a material is considered plastic if it does not recover its original shape when the applied force is released. The plasticity of a substance is a measure of its capacity for such deformation.

*Ductility.*—As used herein the term ductility is a measure in cm. of the cohesion of a plastic material as determined by the well known method due to Dow. (See for example "Asphalts and Allied Substances" by H. Abraham, p. 848, 4th ed., Van Nostrand, 1938.)

*Penetration.*—As used herein the term penetration is the degree of plasticity measured at any temperature by the distance in units of 0.01 cm. that a specified needle can be pressed into a plastic material by a force of 100 grams acting for a period of 5 seconds. The procedure for making such tests is described under the title "Test No. D5-25" of the American Society for Testing Materials (A. S. T. M.). A substance whose penetration varies with temperature is said to be thermoplastic.

*Penetration susceptibility.*—As used herein the terms penetration susceptibility shall be taken as the change in the common logarithm of penetration for one degree change in temperature $$\left(\frac{d \log_{10} p}{dT}\right)$$

The penetration susceptibility of the fuels and propellants described herein is practically independent of temperature over a wide range and is thus approximately a straight line when the logarithm of penetration is plotted against temperature.

GENERAL DISCUSSION

In Fig. 1 there is illustrated a rocket motor having a plastic propellant cast in a plastic lined combustion chamber. For simplicity the motor shall be described in its standing position (with its axis vertical) as this is the normal position of the motor during storage.

This rocket motor comprises an elongated cylindrical vessel 17 of uniform circular cross sectional area for a substantial portion of its length and having its thrust axis X—X vertical. The bottom (closed) end of the vessel is rounded. The upper end is threaded to permit closure by a threaded cap 19. The cap has an ignitor 21 and a converging-diverging nozzle 23 of the De Laval type embodied therein. Except for the opening in the throat 25 of the nozzle, the vessel and cap form a closed combustion chamber.

The ignitor and nozzle are not drawn to scale; in practice the ignitor and nozzle are so proportioned and positioned on the cap that gas exhausted through the nozzle will not burn the ignitor.

The nozzle may be secured to the end plate by any suitable means such as a collar 31 projecting from the exterior periphery of the nozzle and fitting snugly in a countersunk bore in the interior face of the cap 19. The nozzle may be held in place by means of a retaining ring 33 held against the lower face of the nozzle within the combustion chamber by means of screws 35 threadably engaging the wall of the cap as shown more in detail in Fig. 2. The minimum cross sectional area of the nozzle throat is made appreciably smaller than the cross-sectional area of the combustion chamber so as to permit gas to form at high pressure and temperature within the combustion chamber and escape through the nozzle at high velocity.

The ignitor comprises a hollow elongated body member 55 having a restricted open end 37 therein threadably secured to the cap in a threaded bore 38 extending through the cap wall. Said ignitor includes an ignition charge 39 with a Nichrome filament 40 embedded therein at the upper end. A secondary ignitor charge 43 has a passage aligned with the axis of said body member and is included within the large portion of the body member between the ignition charge 39 and the open end 37. Insulated electrical leads 41 connected to the filament pass through insulated passages in the wall of a cap 42 which seals the upper end of the ignitor body 36.

A propellant charge 27, composed of a thermoplastic material fills said vessel up to some predetermined level and has a substantially flat horizontal exposed (free) surface 28 at the upper end. A liner 29 binds the propellant charge to the vessel wall at least on the upper portion of the side surface of the charge but preferably throughout the entire side surface. For simplicity of manufacture, the liner is cast in the vessel and covers the entire surface of that portion of the vessel which includes the propellant charge.

Said liner is made of a material which may readily adhere to the chamber wall and to the propellant charge and is preferably of a thermoplastic nature. Such a plastic liner improves the dependability of the rocket motor, especially if the propellant charge comprises a fine grained component, and is preferably composed of a material which is more plastic than the propellant material itself so as to reduce any tendency of the propellant charge itself to fracture when subjected to shock or thermal stresses.

Said rocket motor may be secured to the under portion of an airplane in any convenient manner such as by straps (not shown) attached to the airplane and fastened snugly about the wall of the combustion chamber. The operation of such a rocket motor may be initiated by passing electricity through said filament 40 by connecting said leads through a switch in the pilot's compartment to a battery or other source of electrical energy. When the ignition temperature of said ignition charge 39 is reached, said charge explodes and ignites the secondary charge 43, which in turn projects hot gases against the exposed surface 28 of the propellant charge, thereby initiating the combustion of the propellant.

As the propellant charge burns, it is converted into gas at high temperature and pressure. As the pressure in the open portion 43 of the combustion chamber increases, the combustion extends across the entire cross section of the rocket motor and the charge burns more rapidly. If the charge is functioning properly, i. e., the combustion is properly restricted, the combustion progresses through the charge in a direction parallel to the motor axis X—X always leaving a substantially flat exposed surface normal to the motor axis until the entire charge is consumed. The spreading of combustion to the remaining exterior surface of the propellant charge is prevented by virtue of the fact that a gas-proof bond exists between said surface and the vessel wall. In this case proper bonding is secured by means of the plastic liner.

While the jet motor operates gas escapes through the throat of the nozzle 23 with a high velocity. During the initial stage of operation the gas pressure within the combustion chamber increases rapidly soon reaching a maximum value indicated by the portion $a$ of the curve R shown in Fig. 3 within a short time of the order of about one second. As the burning continues the volume of the uncharged portion 43 of the combustion chamber increases and the pressure usually decreases gradually at a slow rate as indicated by the slightly inclined portion $b$ of said curve. Finally at the end of the period of motor operation the pressure decreases rapidly as indicated by the steep portion $c$ of said curve. The temperature of the gas varies in a corresponding manner. Thus, during the extended period when the pressure is decreasing gradually, the thrust produced by the rocket motor due to the escape of gas through the nozzle is substantially constant. This constancy is achieved by limiting the burning of the charge at any one time to a flat surface of uniform cross section extending across the vessel and by continuing the burning for a long time.

If for some reason the propellant charge should be separated from the chamber wall at the exposed end, the propellant may burn at the separated portion and as a result build up pressure within the combustion chamber at an unexpectedly excessive rate. Such burning on the side of the charge may extend over a wider area very rapidly and thereby produce unrestricted burning of the charge. In such a case the combustion of the propellant is accelerated, thus generating gas at a higher average pressure and for a shorter time and quickly spends itself as indicated by the sharply peaked curve U of Fig. 4.

Similar failures are likely to occur due to deep fissures that may exist at the exposed end of the propellant charge. Such fissures might arise, for example, by fracturing produced by thermal stresses created within the charge when rapid temperature changes take place prior to operation. In this instance too unrestricted burning occurs, building up pressure at an excessive rate and expending the propellant in a short time.

If, however, the charge should separate from the chamber wall at a point remote from its exposed end, or should fissure within the body of the charge, there is less danger of unrestricted burning. This is probably due to the fact that as the gas pressure builds up within the combustion chamber the plastic charge is urged toward the closed end of the chamber, thereby securely bonding the charge to the wall at such a point of separation and closing such fissures.

A second embodiment of my invention is shown in Fig. 3. In this instance, the combustion chamber is flat at the end thereof remote from the nozzle and is adapted to hold a cartridge containing a plastic propellant.

Thus, as shown a soft paper cartridge 51 of cylindrical cross section is filled with a plastic propellant bonded to the cartridge wall. The cartridge fits snugly within the combustion chamber vessel 17 with the open end of the cartridge at the nozzle end of the motor.

In this instance the burning of the propellant is restricted to the exposed end of the propellant by virtue of the fact that the propellant is firmly bonded to the cartridge wall and the material of which the cartridge wall is made burns more slowly than the propellant itself.

In this case too, it is advisable to store the cartridges or the charged motors in a vertical position to avoid separation of the propellant charge from the cartridge wall and to provide for self-sealing of any fissures that might occur within the propellant charge or at its open end.

The propellants which I have found particularly suitable for my purposes have comprised fine particles of solid oxidizing agents substantially uniformly dispersed in a matrix formed by a plastic fuel. Such matrices serve as binding agents for the oxidizers and when used in sufficient quantities render the resulting propellants substantially impermeable even if slightly porous by incomplete compacting. Such a matrix gives both coherence and plasticity to the resulting propellant. Besides acting as a binding agent and filler such a matrix acts as a cushion between the particles of oxidizer thereby reducing the transmission of shock from one portion of the oxidizing agent to another. Without this cushioning effect shock might be propagated rapidly and detonation ensue.

For all the plastic propellants for which I have made penetration measurements, I have found that the propellants become too brittle to be reliable if the penetration is less than about 6 and that the propellants become too fluid for satisfactory operation if the penetration exceeds about 100. Due to individual peculiarities of the propellants, satisfactory operation over either a wider or narrower range may be achieved. The exact penetration limit over any individual propellant that may be relied upon may be found experimentally. At the average temperature of the range within which operation of the motor is intended, the penetration should be about 25. Illustrative examples of some of the specific propellants and their method of manufacture which I have found satisfactory will be discussed hereinbelow.

In all of the examples of propellants here considered the composition is 75% $KClO_4$ and 25% fuel by weight though the amount of oxidizer may readily be varied between about 50 to about 90% and still produce a satisfactory propellant. All of the propellants were slightly porous though impermeable and had specific gravities of about 1.5 to 1.8.

The principal steps followed in charging a rocket motor are set forth in the block diagram and flow chart shown in Fig. 5. Reference should be made to that flow chart in conjunction with the following discussion.

Measurements of penetration of various propeldants are graphed in Fig. 6. The subscripts of the letters P on the curves given there indicate the number of the example below in which the corresponding propellant is discussed. In this figure ordinates represent the common logarithms of the penetration values and abscissae represent temperature in °F.

On the penetration curves points marked with small crosses (+) indicate the limits of the temperature range outside of which I have found that blowouts are very likely to occur.

The potassium perchlorate used usually assayed 99% purity and contained less than 0.2 of 1% moisture, less than 0.15 of 1% potassium chlorate ($KClO_3$), and less than 0.15 of 1% potassium chloride (KCl).

The potassium perchlorate was ground and screened so as to have one of the following specifications:

SPECIFICATION No. 1

|  | Percent |
|---|---|
| Through 100 mesh | 100 |
| Through 200 mesh | 15 |

SPECIFICATION No. 2

|  | Percent |
|---|---|
| Through 125 mesh | 100 |
| Through 150 mesh | 97 to 99.75 |
| Through 200 mesh | 90.0 to 96.0 |
| Through 325 mesh | 70.0 to 80.0 |

Potassium perchlorate having Specification No. 1 was used in the propellants of Examples Nos. 1 and 2 and those Specification No. 2 in those of the remaining examples.

*Example 1*

A vessel was lined with a coating of Floatine S asphalt, such coating having a thickness of between about $\frac{1}{16}''$ and $\frac{3}{32}''$. If the liner is much thinner, there is danger of forming a bare patch between the propellant and the vessel wall when the charge is cast. If the thickness exceeds $\frac{3}{32}''$ by any substantial amount, an unnecessary reduction in the amount of thrust obtainable from the motor is produced.

The procedure used for producing the coating comprised pouring sufficient asphalt into the vessel at about 350° F. with the open end directed downward at a small angle from the horizontal and rotating the vessel rapidly while the asphalt gravitated downward along the side of the vessel. The thickness of the liner obtained depends in part upon the angle of tilt, the rate of rotation, the temperature of the liner material at the time it is cast, and its viscosity.

A propellant was then prepared by gradually adding finely comminuted potassium perchlorate to a batch of Floatine S asphalt maintained at a temperature of 350° F. in an oil bath. As the potassium perchlorate was added, the mixture was stirred in order to incorporate the potassium perchlorate completely and to produce a uniform dispersion of the oxidizer in the resulltant mixture. The resultant propellant had a penetration of about 10 at 70° F. and a susceptibility of about 0.016. The variations of penetration with temperature of the resultant propellant are indicated by curve $P_1$ in Fig. 6.

After the coating on the interior wall of the vessel had cooled and hardened the propellant mixture was poured at a temperature of 350° F. into the coated vessel where it was permitted to cool to atmospheric temperature while the vessel stood in its normal storage position, that is with its axis X—X vertical.

Motors of the type shown in Fig. 1 charged by this process performed satisfactorily under a wide variety of handling conditions. This propellant operated satisfactorily between about 45° F. and 130° F. The temperature limits between which satisfactory operation could be obtained are indicated by $x$'s on curve $P_1$.

TABLE I

|  | 1 | 2 |
|---|---|---|
|  | Floatine S | Floatine S +15% Aristo |
| Flash point (Cleveland Open Cup) °F | 465 | 406 |
| Softening point (ring-and-ball) °F | 163.5 | 137 |
| Penetration (0.01 cm./100 gms./5 secs.): |  |  |
| 32° F | 3 | 11 |
| 45° F |  | 23 |
| 77° F | 26 | 71 |
| 100° F | 59 | 166 |
| Ductility (5 cm./min.): |  |  |
| 32° F cm | 1.0 | 4.5 |
| 45° F cm |  | 5.7 |
| 55° F cm |  | 7.2 |
| 77° F cm | 5.8 | 53 |
| 100° F cm | 24.7 | over 100 |
| Solubility in $CS_2$ per cent | 99.98 | 99.90 |
| Solubility in $CCl_4$ do | 99.85 | 99.80 |
| Specific gravity (25° C./25° C.) | 1.0375 | 1.0229 |
| Cal. value (B. t. u./lb.) | 18,149 |  |
| Sulfur per cent | 3.3 to 4.2 |  |
| Hydrogen do | 7.8 to 10.0 |  |
| Carbon do | 81.8 to 84.60 |  |

Floatine S is the trade name for an air-blown asphalt manufactured by the Paraffin Companies, Inc., Emeryville, California. This asphalt is derived from crude petroleum obtained from a field located at Orcutt, California.

*Example 2*

A fuel adapted for reliable operation over a wide temperature range was made by adding 15% Aristo oil having a viscosity rating of SAE 10 to 85% Floatine S asphalt to form a fuel mixture. The two fuel components were thoroughly mixed by heating and stirring together at a temperature of 350° F.

Aristo oil is produced by the Union Oil Company, (Wilmington, California,) by a solvent process. The specifications of this oil are given in Table II. The specifications of the resultant fuel mixture are given in column 2 of Table I.

A liner from $\frac{1}{16}''$ to $\frac{3}{32}''$ thick was formed in the vessel by pouring sufficient quantity of the fuel mixture into the vessel at a temperature of 350° F. and tilting and rotating the vessel as hereinbefore described in conjunction with Example 1.

Potassium perchlorate was incorporated in the asphalt-oil mixture fuel by adding it gradually and stirring the mixture thoroughly, all the while maintaining the temperaure of the resultant mixture between about 220° and about 350° F. If the temperature of the propellant mixture should be raised inadvertently too high (about about 400° F.) potassium perchlorate is liable to decompose. Below a temperature of about 220° F., the mixture became difficult to work.

The propellant mixture was then poured into the coated vessel while the mixture was at a casting temperature between 240° F. and 260° F., and puddled regularly by agitating with a rod to reduce formation of air bubbles and pockets in the charge.

It was found desirable to control the casting temperature accurately. At the temperature indicated the propellant has a consistency comparable to that of putty or bread dough and is accordingly readily cast. Below this temperature the propellant becomes more difficult to work. If the propellant is poured at a higher temperature the liner is liable to melt through at some points.

TABLE II

*Properties of Aristo Oil, SAE 10*

| | | |
|---|---|---|
| Pour point | °F | 30 |
| Gravity | A.P.I. | 20.5 |
| Viscosity (Saybolt Universal): | | |
| 100° F | sec | 44 |
| 210° F | sec | 44 |
| Sulfur | per cent | 0.75 |
| Carbon | do | 87.11 |
| Hydrogen | do | 12.14 |
| Cal. value (B. t. u./lb.) | | 19,336 |

The penetration vs. temperature curves for the propellant is indicated by the curve marked $P_2$ in Fig. 6. The propellant had a penetration of about 20 at 70° F., and a susceptibility of about 0.016.

Robert motors formed by this process operated satisfactorily between 30° and 120° F., the limits being indicated by x's on the penetration-temperature curve.

*Example 3*

Another fuel was prepared having the composition of 70% Floatine S asphalt and 30% Aristo oil, and a propellant prepared and a motor charged by substantially the same procedure as that described in Example 2.

Motors lined with such a fuel and charged with a propellant comprising such a fuel, were found to operate satisfactorily over a temperature range extending from about minus 5° F. to about 90° F. The limits of the safe operating range are also indicated by x's on the curve. Penetration vs. temperature data for this propellant is represented by curve $P_3$ in Fig. 6. The propellant had a penetration of about 80 at 70° F., and a susceptibility of about 0.016.

It is noted that the propellants of Examples 1 and 2 have about the same penetration susceptibility even though the penetrations of the compositions differed widely at any given temperature. The addition of light oil thus renders the propellant softer and permits operation at lower temperatures.

*Example 4*

A propellant was prepared utilizing a fuel comprising 85% Floatine S and 15% Pennsylvania oil sold under the trade name of "Pure Penn Oil" by the Union Oil Company. Except for the change in oil and the grind of the perchlorate this propellant had the same composition as that in Example 2. The penetration vs. temperature curve for the resultant propellant is indicated by curve $P_4$ in Fig. 6. This propellant had a penetration of about 22 at 70° F. and a susceptibility of about 0.0137.

This propellant was plastic over a wider temperature range than those described in Examples 1 to 3 inclusive. The improvement in penetration susceptibility is due to the fact that the blending oil is of a paraffinic nature and has a relatively high viscosity index (100).

Motors made with this propellant by substantially the same procedure described in Example 3 were found to operate satisfactorily over a temperature range from about 12° F. to 120° F. The temperature limits are indicated by x's on the penetration-temperature curve.

*Example 5*

A propellant having the same composition as Example 3 above was prepared except that "Pure Penn Oil" was used instead of Aristo. This propellant had a penetration of 45 at 70° F. and a susceptibility of 0.0116. This propellant operated safely between −5° F. and 105° F.

*Example 6*

A propellant was prepared from a fuel composed of 85% Economy asphalt and 15% "Pure Penn Oil." The penetration vs. temperature curve for this propellant is represented by the line $P_6$ of Fig. 6. This propellant had a penetration of about 20 at 70° F., and a susceptibility of about 0.0065.

Motors were lined and charged by the processes hereinabove described and were found to operate safely above 20° F. However, the upper safe temperature limit was not found though it was well over 120° F.

Economy asphalt is manufactured by the Wilshire Oil Company (Los Angeles, California) from crude petroleum obtained from Ojai, California.

RANGE OF OPERATION

From the foregoing examples it will be observed that when the penetration of a propellant falls below about 6, i. e., below a value between about 4 to 8 the propellant charge becomes so brittle that there is a high probability of failures occurring. Similarly if the penetration becomes much over about 100 the propellant becomes too liquid to be relied upon. When such propellant charges are used under service conditions the penetration should be safely within this range say between about 8 and 80 or even between about 10 and 75.

The penetration at the average temperature of the safe operating range for each of the propellants discussed in Examples 1 to 6 are designated by small circles on the respective penetration-temperature curves. From this data it is clear that if motors charged with a given propellant are to be used over a given temperature range depending on weather conditions or other similar factors influencing the ambient temperature of operation, the propellant should have a penetration of about 25 (i. e. between about 20 and about 30) in the middle of its operating range. The propellant should preferably have a low susceptibility. Such low susceptibility may be achieved for example by utilizing as a fuel a mixture of a high viscosity paraffin base oil and a mixed base asphalt such as those obtained from Mexico or Mid-Continent crudes.

RECONDITIONING CHARGED MOTORS

Rocket motors charged with thermoplasite propellants may be used safely, if they have been stored without excessive jarring at temperatures within the operating range of the individual propellant. If for some reason, the rocket motors have been subjected to temperatures outside of such range for a substantial period of time, or have been handled roughly in shipment, they may be reconditioned by subsequent storage at a suitable temperature within said range. As a further aid in reconditioning the motor, may be bounced by dropping on its bottom. The length of the reconditioning period required will depend upon the prior history of the motor and the temperature at which the reconditioning process is carried out.

Such successful reconditioning by heat treatment of the propellant charge is made possible by virtue of its thermoplastic nature. The charges remain in a ready safe condition partly because of the ductility which permits the charge to hold together and partly because of the plastic flow characteristics. When a rocket motor of the type described herein is stored with the motor axis in its normal storage position (axis vertical) the plastic propellant tends to flow slowly under the influence of its own weight and at a rate dependent upon its temperature, thereby both sealing any fractures that might exist on the charge surface or within the charge and also bonding itself to the chamber wall.

SUMMARY

While I have illustrated my invention by specific reference to fuels composed of asphalt and asphalt oil mixtures, it is to be understood that satisfactory thermoplastic propellants may be made from other fuels having suitable combustion characteristics and comparable plasticity. Materials which may be used as fuels include cup grease, rubbery type vegetable oil pitch, mixtures of coal tar pitch and ethyl cellulose, mixtures of various asphalts, and other combustible thermoplastic materials. Other oxidizers may also be used.

By charging a vessel (or a cartridge) adapted for forming part of a combustion chamber of a rocket motor with a thermoplastic propellant of suitable penetration in the range of operation, reliable restricted burning may be achieved. Such charging is preferably performed by casting the propellant in the motor by pouring at an elevated temperature. In the preferred embodiment of my invention the vessel is coated with a thermoplastic oxidizer free liner which is softer than the propellant itself and which is adapted to adhere to both the propellant and the vessel wall. Such liners improve the reliability of the motor at the extreme temperatures of operation especially the low temperatures. By virtue of their restricted burning characteristic, which may be depended upon for long times after charging, motors charged with such propellants are exceedingly dependable and at the same time achieve high efficiency in the utilization of thermal energy of propellants especially for assisted take-off purposes.

From the foregoing disclosure of my invention it is seen that I have provided improved propellants and rocket motor adapted for restricted burning and have also provided a simple method for preparing such propellants and for charging such rocket motors.

I claim:

1. In combination with a vessel forming a rocket motor combustion chamber, a thermoplastic coating on the interior wall of the chamber, and a thermoplastic propellant charge filling the coated portion of the chamber, said coating adhering to the propellant charge and to the chamber wall.

2. In combination with a vessel forming a rocket motor combustion chamber, a thermoplastic asphalt base coating on the interior wall of the chamber, a thermoplastic asphalt base propellant charge filling the coated portion of the chamber, said coating adhering to the propellant charge and to the chamber wall.

3. In combination with a vessel adapted for forming part of a rocket motor combustion chamber, a thermoplastic propellant charge filling a portion of the chamber including the closed end, a coating on the interior wall of the chamber at said end, said coating being adapted to adhere to the propellant charge and to the chamber wall.

4. In combination with a vessel forming a rocket motor combustion chamber, an impermeable thermoplastic propellant charge consisting of one component suspended in another with which it is adapted to react upon ignition, said charge being bonded to the vessel wall by a thermoplastic layer interposed between wall and charge.

5. In combination with a vessel forming a rocket motor combustion chamber, an impermeable plastic propellant charge consisting of one component suspended in another with which it is adapted to react upon ignition, said charge having a flat surface at the free end thereof and having its remaining exterior surface bonded to the vessel wall by a thermoplastic layer.

6. In combination with a vessel forming a rocket motor combustion chamber, a thermoplastic propellant charge therein and a coating substantially free of oxidizer between the surface of the charge and the vessel wall and adapted to prevent ignition of the side wall of said charge, said coating adhering to the propellant charge.

7. In combination with a vessel forming a rocket motor combustion chamber, a thermoplastic propellant charge therein consisting of an asphalt base fuel and a finely divided solid oxidizer, and an adhesive asphalt base coating substantially free of oxidizer between the surface of the charge and the vessel wall and bonding the two together and adapted to prevent ignition of the side wall of said charge, said coating adhering to the propellant charge.

8. In combination with a vessel adapted for forming part of a rocket motor combustion chamber, a ductile thermoplastic propellant charge cast therein and bonded thermoplastically to the vessel wall.

9. In combination with a vessel adapted for forming part of a rocket motor combustion chamber, an impermeable ductile thermoplastic propellant charge therein, and a thermoplastic coating bonding the charge to the vessel wall.

10. In combination with a vessel forming a rocket motor combustion chamber, an adherent coating on a part of the interior wall of the chamber including the closed end thereof, said coating comprising a mixture of asphalt and oil, and a propellant charge filling the coated portion of the chamber and adhering to the coating, said propellant charge consisting of a finely ground solid oxidizer suspended in a fuel mixture of asphalt and oil and having a penetration between about 6 and 100 at the temperature of motor operation, said coating adhering to the propellant charge and to the chamber wall.

11. In combination with a vessel forming a rocket motor combustion chamber, an adherent asphaltic coating on a part of the interior wall of the chamber including the closed end thereof, and a propellant charge filling the coated portion of the chamber, said propellant charge comprising between about 50% and 90% finely ground $KClO_4$ by weight, the remainder being a fuel mixture of asphalt and oil, said propellant having a penetration between about 6 and 100 at the temperature of motor operation, said coating adhering to the propellant charge and to the chamber wall.

12. In a rocket motor, the combination which comprises a combustion chamber, a thermoplastic lining substantially free of oxidizer bonded to the chamber wall, and a thermoplastic propellant charge having a finely divided solid oxidizer distributed therein disposed in the chamber and adhering to the lining.

13. A propellant charge in the form of a solid stick without crevices or voids and having a penetration from 6 to 100 at the ambient temperature, said stick having a side wall and a flat continuous exposed end surface, said charge comprising a mixture of about 75% potassium perchlorate and about 25% of thermoplastic fuel consisting principally of asphalt, the side wall of said charge being lined with a thermoplastic liner containing asphalt with substantially no oxidizer, said liner being intimately adherent to the wall of the charge, whereby burning may readily occur on the exposed end surface but not on the lined side wall.

14. A propellant charge in the form of a solid stick without crevices or voids, said stick having a a side wall and a flat continuous exposed end wall, said charge comprising a mixture of about 75% potassium perchlorate and about 25% of thermoplastic fuel, the fuel consisting of about 85% airblown asphalt and about 15% oil, the side wall of said charge being lined with a thermoplastic liner containing asphalt with substantially no oxidizer, said liner being intimately adherent to the wall of the charge, whereby burning may readily occur on the exposed end surface but not on the lined side wall.

15. A propellant charge in the form of a solid stick without crevices or voids, said stick having a side wall and a flat continuous exposed end surface, said charge comprising a mass of thermoplastic propellant having a penetration between 6 and 100 at the ambient temperature, the propellant composition comprising a fuel selected from the group consisting of asphalt and an asphalt-oil mixture, and a finely divided potassium perchlorate oxidized mixed with the fuel, the proportioin of the oxidizer being from 50% to 90% by weight of the composition, the side wall of said charge being lined with a thermoplastic liner containing asphalt with substantially no oxidizer, said liner being intimately adherent to the wall of the charge, whereby burning may readily occur on the exposed end surface but not on the lined side wall.

16. A propellant charge for use in the chamber of a rocket motor, said charge comprising a unitary solid stick of a thermoplastic composition having a side wall and an end wall which is exposed for burning, the stick being substantially free from crevices and voids and having a penetration from 6 to 100 at the ambient temperature, the composition of the stick comprising a fuel consisting of hydrocarbon material from the group consisting of asphalt and an asphalt-oil mixture, and an oxidizer consisting of finely divided potassium perchlorate mixed with the fuel, the fuel being present in an amount from 10% to 50% by weight of the composition and the oxidizer being present in an amount from 90% to 50% by weight of the composition.

17. A propellant charge according to claim 16 in which the asphalt is airblown asphalt.

18. A propellant composition comprising a mixture of about 75% potassium perchlorate and 25% of thermoplastic fuel, the fuel consisting of about 30% S. A. E. No. 10 oil and 70% asphalt.

19. A composition according to claim 18 in which the asphalt is air-blown asphalt.

20. A propellant composition comprising a mixture of about 75% potassium perchlorate and 25% of thermoplastic fuel, the fuel consisting of about 15% S. A. E. No. 10 oil and 85% asphalt.

21. A propellant composition according to claim 20, wherein the asphalt is air-blown asphalt.

22. A propellant composition comprising a mixture of a solid oxidizer and thermoplastic fuel, the oxidizer being from about 50% to 90% by weight of the composition, the thermoplastic fuel consisting of a mixture of asphalt and S. A. E. No. 10 oil, the oil being about 15% of the asphalt-oil mixture.

23. A propellant composition according to claim 22 in which the asphalt is air-blown asphalt.

24. A propellant composition comprising a mixture of potassium perchlorate and a thermoplastic asphalt-base fuel, said asphalt base fuel having the following physical properties:

| | |
|---|---|
| Flash point | About 465° F. |
| Softening point (ring-and-ball) | About 163.5° F. |
| Penetration at 77° F. with a loading of 100 g./5 sec | About 26 |
| Ductility (5 cm./min.) at 77° F. | About 5.8 cm. |
| Solubility in CS$_2$ | About 99.98% |
| Solubility in CCl$_4$ | About 99.85% |
| Specific gravity 25° C./25° C. | About 1.037 | the potassium perchlorate being present in amounts varying from 50-90% by weight of the propellant composition and the fuel being present in amounts varying from 50-10% by weight of the propellant composition.

25. A propellant composition comprising a mixture of potassium perchlorate and a thermoplastic asphalt-base fuel comprising 70-85% asphalt and from 15-30% S. A. E. No. 10 oil, said asphalt base fuel having the following physical properties:

| | |
|---|---|
| Flash point | About 456° F. |
| Softening point (ring-and-ball) | About 163.5° F. |
| Penetration at 77° F. with a loading of 100 g./5 sec | About 26 |
| Ductility (5 cm./min.) at 77° F. | About 5.8 cm. |
| Solubility in CS$_2$ | About 99.98% |
| Solubility in CCl$_4$ | About 99.85% |
| Specific gravity 25° C./25° C. | About 1.037 | the potassium perchlorate being present in amounts varying from 50-90% by weight of the propellant composition and the fuel being present in amounts varying from 50-10% by weight of the propellant composition.

26. A propellant charge in the form of a solid stick without crevices or voids and having a penetration from 6 to 100 at ambient temperature, said stick having a side wall and a continuous exposed end surface, said charge comprising a mixture of potassium perchlorate and a thermoplastic fuel consisting principally of asphalt, the percentage of the perchlorate being between 50% and 90% by weight of the charge based on the weight of the propellant, the side wall of said charge being lined with a thermoplastic liner containing asphalt with substantially no oxidizer, said liner being intimately adherent to the wall of the charge whereby burning may occur on the exposed end surface and not on the side of the wall.

JOHN W. PARSONS.

REFERENCES CITED

The following references are of record in the file of this patent:

UNITED STATES PATENTS

| Number | Name | Date |
|---|---|---|
| 294,978 | Eiseman | Mar. 11, 1884 |
| 659,842 | Beneké | Oct. 16, 1900 |
| 1,041,745 | Corbin | Oct. 22, 1912 |
| 1,102,653 | Goddard | July 7, 1914 |
| 1,211,721 | Landsberg | Jan. 9, 1917 |
| 1,670,689 | Olmstead | May 22, 1928 |
| 1,879,579 | Stolfa et al. | Sept. 27, 1932 |
| 1,924,435 | Homer | Aug. 29, 1933 |
| 1,958,803 | Segnitz | May 15, 1934 |
| 2,043,268 | Skinner | June 9, 1936 |
| 2,103,237 | Deckert | Dec. 28, 1937 |
| 2,172,163 | Glowka | Sept. 5, 1939 |
| 2,186,667 | Churchill | Jan. 9, 1940 |
| 2,231,769 | Merrill | Feb. 11, 1941 |
| 2,278,847 | Greguoli | Apr. 7, 1942 |
| 2,293,249 | Fischer | Aug. 18, 1942 |

FOREIGN PATENTS

| Number | Country | Date |
|---|---|---|
| 1,969 | Great Britain | 1882 |
| 10,362 | Great Britain | 1897 |
| 2,172 | Great Britain | 1915 |
| 14,932 | Great Britain | 1915 |
| 125,128 | Great Britain | Apr. 17, 1919 |
| 453,210 | Great Britain | Sept. 7, 1936 |
| 477,678 | France | Nov. 4, 1915 |
| 502,560 | France | Feb. 24, 1920 |

Certificate of Correction

Patent No. 2,563,265                      August 7, 1951

JOHN W. PARSONS

It is hereby certified that error appears in the printed specification of the above numbered patent requiring correction as follows:

Column 3, line 15, for "60,0000 lbs." read *60,000 lbs.*; column 7, line 67, for "resulltant" read *resultant*; column 9, line 17, Table II, for
"100° F_____sec__ 44"  read  *100° F_____sec__ 210.5* and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*